United States Patent Office 3,030,406
Patented Apr. 17, 1962

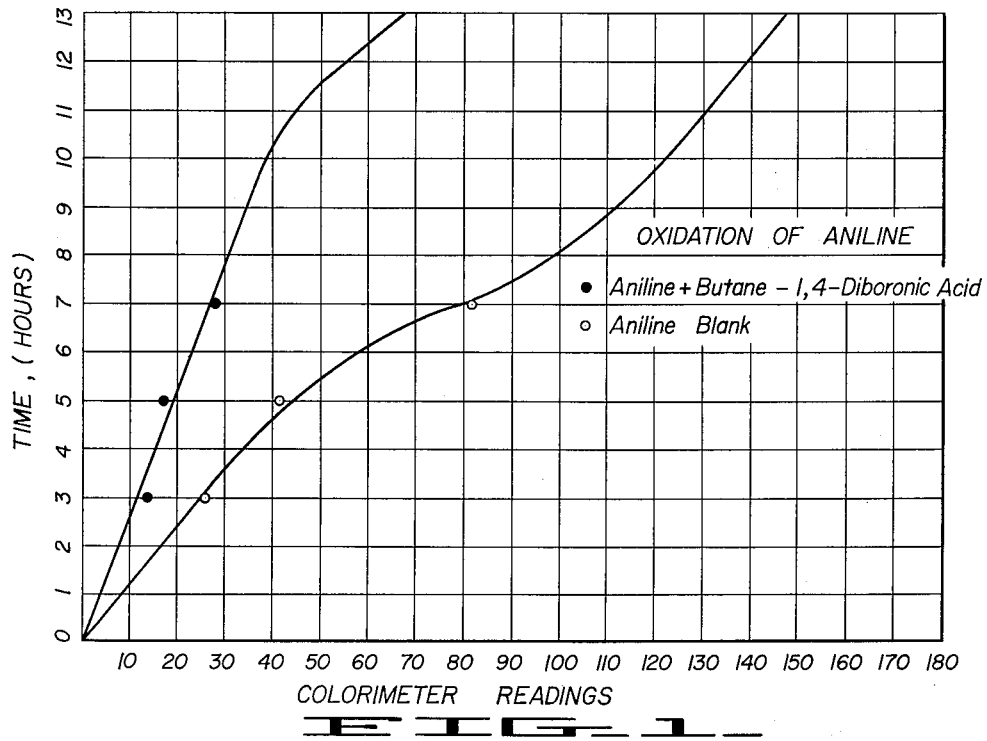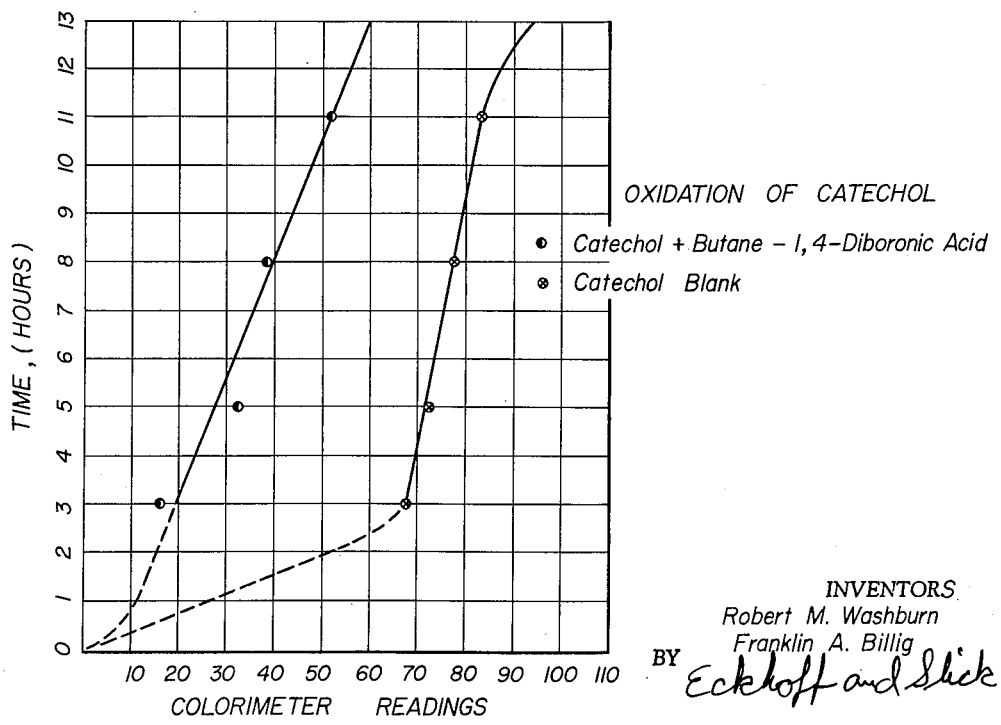

3,030,406
ALIPHATIC BORONIC ACIDS AND ESTERS
Robert M. Washburn and Franklin A. Billig,
Whittier, Calif.
Filed Oct. 8, 1958, Ser. No. 766,016
26 Claims. (Cl. 260—462)

This invention relates to new and improved methods of preparing both new and previously known organo-boron compounds. The compounds included in our invention are characterized by having one or more carbon atoms bonded to boron atoms. The carbon-containing moiety may be aliphatic or substituted aliphatic. The general classes into which these compounds fall are the aliphatic monoboronic and polyboronic acids, aliphatic monoborinic acids and aliphatic borines. An extension of this invention relates to the esters and anhydrides of the aliphatic polyboronic acids.

Organo-boron compounds falling within the various classes given above have been known for many years (Krause and Von Grosse, "Die Chemie der Metall-Organischen Verbindungen," Borntraeger, Berlin, 1937).

The method normally used to prepare aliphatic boronic acids, borinic acids and borines involves the reaction of the appropriate Grignard reagent with a borate ester or a boron trihalide.

The preparation of aliphatic boronic acids by the usual method is shown in Equations 1 and 2, where R and R' represent alkyl radicals:

$$RMgBr + (R'O)_3B \rightarrow RB(OR')_2 + Mg(OR)Br \quad (1)$$
$$RB(OR')_2 + 2H_2O \rightarrow RB(OH)_2 + 2R'OH \quad (2)$$

The reaction represented by Equation 1 is usually performed by adding an appropriate Grignard reagent to a diethyl ether solution of the borate ester maintained at $-60$ to $-80°$ C.

The preparation of aliphatic borines by the usual method is shown in Equation 3:

$$3RMgBr + BX_3 \rightarrow R_3B + 3MgBrX \quad (3)$$

The reaction is usually performed by adding the boron trihalide to an ethereal solution of the Grignard reagent.

The methods normally used to prepare the aliphatic borinic acids involve the reaction of the appropriate borine with moist air or a hydrogen halide, as shown in Equations 4 and 5, where R represents an alkyl radical:

$$R_3B + O_2(\text{moist}) \rightarrow R_2BOH \quad (4)$$

$$R_3B + HX \xrightarrow{H_2O} R_2BX \longrightarrow R_2BOH \quad (5)$$

It has also been reported (Letsinger and Skoog, J. Am. Chem. Soc. 76, 4174 (1955)) that aliphatic borinic acids may be prepared by the reaction of an appropriate Grignard reagent with the mixed borate ester of an aliphatic alcohol and an aliphatic diol. In this case, the Grignard reagent was added to an ethereal solution of the borate ester; this was followed by hydrolysis; then separation of the borinic acid by distillation as the ethylene glycol ester. Finally, Brindley, Gerrard and Lappert (J. Chem. Soc. 1955, 2956) report that an alkyl-lithium reacts with a tri-alkyl borate to yield dialkyl-alkylboronates which in turn may be hydrolyzed to yield the desired monoboronic acid.

We have found that aliphatic sodium compounds will react smoothly with borate esters to give high yields of aliphatic boronic acids, borinic acids or borines. In general, the reaction for the preparation of all but the polyboronic acids may be schematically represented as follows:

$$(3-n)RNa + (R'O)_3B \longrightarrow R_{3-n}B(OR')_n \xrightarrow{H_2O} RB\begin{matrix}Z\\ \diagdown \\ Y\end{matrix}$$

wherein $n$ is 0, 1 or 2, and Z and Y may be hydroxyl, in which case the compound is a boronic acid; or, Z may be the same as R and Y may be hydroxyl, in which case the compound is a borinic acid; or, both Z and Y may be the same as R, in which case the compound is a borine. The relative proportions of the two reactants determine the compound obtained; thus, one equivalent of each compound yields the monoboronic acid, two equivalents of the sodium compound to one of the ester yield the monoborinic acid, and three equivalents of the sodium compound to one of the ester yield the borine. The reaction for the preparation of the aliphatic polyboronic acid proceeds in much the same fashion:

$$NaR''Na + 2(R'O)_3B \longrightarrow$$
$$(R'O)_2BR''B(OR)_2 \xrightarrow{H_2O} (HO)_2BR''B(OH)_2$$

This reaction is essentially the same as that set out above for the preparation of the aliphatic monoboronic acids, one equivalent of the borate still being used for each equivalent of the sodium. In this general formula R" represents a methylene group or a polymethylene group having between 2 and 10 carbon atoms.

R" may also be trimethylenemethane of pentaerythrityl and one or two additional sodium atoms may be bonded thereto, in which case either one or two additional moles of the borate are necessary for replacement. But the ratio of sodium to borate ester undergoing reaction remains at 1:1.

As a general proposition, the reaction will be carried out in an inert solvent, but such a solvent is not always a necessity. Note, e.g., Example I–b below, that it is possible to use the borate, for example, methyl borate, as both a reactant and a solvent.

Although the above simplified reactions represent the essence of the present invention, the aliphatic sodium compounds are not stable and it is generally preferred to start with the corresponding aliphatic halide (preferably the chloride) and react the halide with finely dispersed metallic sodium in the presence of the borate ester. The dispersion of metallic sodium can be prepared in any suitable manner; an acceptable procedure is set forth in "Sodium Dispersions," published 1953, by National Distillers Chemical Company.

There are several advantages in using the procedure of this invention as against the most closely related procedure referred to above, that of Brindley et al. To prepare dispersions of lithium requires the use of a high boiling (at least 200° C.) inert solvent, such as mineral oil or paraffin. After such a dispersion has been used as a carrier for the lithium, the mineral oil or paraffin must be removed from the reaction mixture, as, for example, by high temperature vacuum distillation. On the other hand, sodium dispersion can be prepared in any inert solvent boiling at about 100° C. or higher. Thus, solvents such as isooctane (b. 97–99°), toluene (b. 110–111°), light naphtha (b. 103–148°), petroleum ether (b. 107–138°), xylene (b. 137–140°), etc., have been used for the preparation of sodium dispersions. The solvents are simply removed from the reaction mixtures by relatively low temperature distillation. This means that very high vacuum is not required and excessive temperatures are not required. These often cause decomposition of the products.

A further point to be considered and emphasized is that the choice of solvents available for sodium reactions is much greater since there are many solvents which are thermally stable at the 100° C. temperature required for preparing sodium dispersions but there are only a very few solvents which do not thermally crack and react in the presence of lithium metal at 200° C.

The products of this reaction may be, as aforementioned, aliphatic monoboronic acids, aliphatic monoborinic acids, or aliphatic monoborines, all of which are known materials having a variety of uses. Another group of products which may be prepared by this reaction and which are new compositions of matter are the aliphatic polyboronic acids, examples of which are the butanediboronic acid, decanediboronic acid, methanediboronic acid, ethanediboronic acid and the neopentanetetraboronic acid set forth in Examples II, XXVII, XVI, XVII and XVIII which appear below. Also, as set forth in examples below, the esters and anhydrides, of these aliphatic polyboronic acids may be prepared from the acids or, in the case of the esters, simply by failing to hydrolyze the product resulting from the aliphatic polysodium compound-borate ester reaction.

The reaction can be carried out in various manners without departing from the spirit of the invention. For example, the aliphatic halide, borate ester and sodium dispersion can be all combined together (see Example I–a), it can be performed in individual steps as by first preparing the alkyl sodium compound and then adding the borate ester (see Example I–b), or the borate ester can be first placed in the reaction vessel and the pre-formed alkyl sodium compound slowly added thereto (see Example I–c). Thus, the complete reaction for preparing the monoboronic acid may be represented by the following series of reactions:

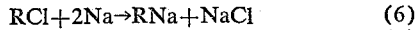
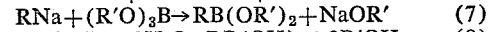
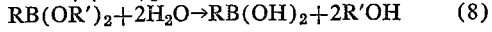

$$RCl + 2Na \rightarrow RNa + NaCl \quad (6)$$
$$RNa + (R'O)_3B \rightarrow RB(OR')_2 + NaOR' \quad (7)$$
$$RB(OR')_2 + 2H_2O \rightarrow RB(OH)_2 + 2R'OH \quad (8)$$

As has been pointed out above, by adjusting the ratio of the aliphatic sodium compound to the trialkyl borate ester, the final product may be $RB(OH)_2$, as above, $R_2BOH$, or $R_3B$, as required.

The analogous reaction for the preparation of a diboronic acid may be represented by the following series of equations when the method described above is used:

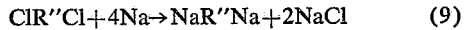
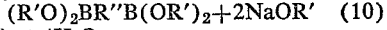
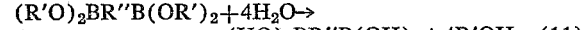
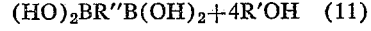

$$ClR''Cl + 4Na \rightarrow NaR''Na + 2NaCl \quad (9)$$
$$NaR''Na + 2(R'O)_3B \rightarrow$$
$$\quad (R'O)_2BR''B(OR')_2 + 2NaOR' \quad (10)$$
$$(R'O)_2BR''B(OR')_2 + 4H_2O \rightarrow$$
$$\quad (HO)_2BR''B(OH)_2 + 4R'OH \quad (11)$$

Equations analogous to those above may be written for the preparation of the triboronic acids and the tetraboronic acids, the important consideration being that the ratio of sodium to borate ester in the second equation of the series must be maintained at 1:1.

The invention can be practiced with any triborate ester and is not limited in this respect. The alcohol moiety of the ester does not enter into reaction to the extent of affecting the desired final product. One can use any of the alkyl or aryl borate esters and while in the following examples the use of only trimethyl borate is shown, this was employed because it is relatively inexpensive and is in plentiful supply. One can use any of the trialkyl borate esters, such as triethyl borate, tripropyl borate, triisopropyl borate; or triphenyl borate ester.

Normally, it is preferred to run the reaction at atmospheric pressure and at a temperature of below about 50° C., but it will be understood that other pressures and temperatures may be used.

*Example I–a—Preparation of butaneboronic acid (in situ procedure).*—Butyl chloride (23.14 g., 0.25 mole) and trimethyl borate (25.98 g., 0.25 mole, plus 0.5 mole [51.46 g.] excess) were placed in a 3-necked flask equipped with a reflux condenser, stirrer and addition funnel. Sodium dispersion (23 g., 0.5 mole) in xylene was added at such a rate that the temperature of the reaction mixture remained below 30° C. After all the sodium dispersion had been added, the reaction mixture was treated with 10% sulfuric acid to hydrolyze the dimethyl butaneboronate. The organic layer was separated and treated with aqueous potassium hydroxide. On separation of the organic layer and acidifying the basic water layer, butaneboronic acid crystallized. The yield of material was 38.5%; M.P. 94–95° C.; analysis: percent B, 10.5, theory 10.6.

*Example I–b—Preparation of butaneboronic acid (direct procedure).*—Butyl sodium (20.03 g., 0.25 mole) was prepared from butyl chloride and sodium using the equipment described in Example I–a. Trimethyl borate (28.0 g., 0.25 mole) was then added to the butyl sodium at such a rate that the temperature of the reaction mixture remained below 30° C. After all the trimethyl borate had been added, the reaction mixture was treated with 10% sulfuric acid to hydrolyze the dimethyl butaneboronate. The organic layer was separated and treated with aqueous potassium hydroxide to remove butaneboronic acid. On separation of the organic layer and acidifying the basic water layer, butaneboronic acid crystallized. The yield of material was 20%, M.P. 93–94° C.; analysis, percent B, 10.3, theory 10.62.

*Example I–c—Preparation of butaneboronic acid (inverse procedure).*—To a solution of methyl borate (28 g., 0.25 mole) and xylene in a 3-necked 500 ml. flask equipped with a condenser, stirrer and addition funnel, was added butyl sodium (20.03 g., 0.25 mole) in xylene at such a rate that the temperature of the reaction mixture remained below 30° C. After the addition was complete, the mixture was hydrolyzed with 10% sulfuric acid. The organic layer was separated and treated with aqueous potassium hydroxide. Butaneboronic acid crystallized out of the water layer upon acidification. The yield of material was 62%; M.P. 93–94° C.; analysis: percent B, 10.4, theory 10.62.

*Example II—Preparation of n-dodecaneboronic acid.*—n-Dodecyl chloride (43.76 g., 0.2 mole) and methyl borate (20.78 g., 0.2 mole plus 103.9 g. [1.0 mole] excess) were placed in an argon-purged apparatus and warmed to 32° C. Sodium dispersion (25% by weight in xylene; 36.8 g. containing 9.2 g. sodium; 0.4 mole) was added at such a rate as to maintain the reaction temperature in the range 34–36° C. After addition was complete, stirring was continued until the temperature fell to 22° C. (4 hours). The reaction mixture was added to distilled water with stirring. A white, waxy solid separated immediately and rose to the surface. The solids were collected on a Buchner funnel, then washed with distilled water and petroleum ether. The solids were slurried in distilled water and extracted with ether. The ether extracts were flash distilled leaving a white, microcrystalline residue. This was slurried in warm petroleum ether and the solids collected and dried to give 12.6 g. of product.

*Analysis.*—Calc. for $C_{12}H_{27}BO_2$: B, 5.10%; C, 67.3%; H, 12.71%. Found: B, 9.06%; C, 44.65%; H, 10.17%. The infrared spectrum indicated the presence of boric acid and dodecaneboronic acid.

Based on the percent boron and assuming the solids to be a mixture of boric acid and the boronic acid, as indicated by the infrared spectrum, then the solids contained 8.57 g. of product (20% yield).

Part of the solids were recrystallized from methanol-water in an inert atmosphere box, M.P. 91–91.5° C.

*Analysis.*—Calc. for $C_{12}H_{27}BO_2 \cdot 3H_2O$: B, 4.04%; C, 53.7%; H, 12.39%. Found: B, 4.11%; C, 55.38%; H, 12.41%. The infrared spectrum indicated that the material was a hydrate of dodecaboronic acid.

A portion (4.44 g.) of the above solid was dissolved in anhydrous methanol and a further 100 ml. methanol added dropwise while slowly distilling out methanol-methyl borate azeotrope. The resulting material was vacuum stripped.

*Analysis.*—Calc. for $C_{12}H_{27}BO_2$: B, 5.10%; C, 67.3%; H, 12.71%. Found: B, 4.94%; C, 68.21%; H, 11.96%. The infrared spectrum indicated that the material was essentially pure dodecaneboronic acid.

*Example III—Preparation of butane-1,4-diboronic acid.*—Butane-1,4-diboronic acid was prepared by the in situ reaction of 1,4-dichlorobutane (12.7 g., 0.1 mole), freshly distilled methyl borate (20.78 g., 0.2 mole, plus 103.9 g., 1.0 mole excess) and sodium dispersion (18.4 g. in xylene, containing 9.2 g. sodium, 0.4 mole). The sodium dispersion was added during a 2.5 hours at such a rate that the temperature remained between 25–30° C. The purple reaction mixture was stirred 25–30 minutes after addition was complete, then hydrolyzed with water to give a two phase system, an upper organic layer and an aqueous layer (pH 4). The acidic water layer was extracted with three 100 ml. portions of ether. The ether extracts were evaporated and a fine microcrystalline residue of crude butane-1,4-diboronic acid was obtained (M.P. 150–153° C.).

*Analysis.*—Calcd. for $C_4H_{12}B_2O_4$: percent B, 14.8. Found: percent B, 13.5.

Infrared analysis indicated strong B—O and B—OH absorption.

In a manner similar to that above, decane 1,10-diboronic acid was prepared in situ by the reaction of 1,10-dichlorodecane (21.1 g., 0.1 mole), freshly distilled triethyl borate (29.24 g., 0.2 mole, plus 146.2 g., 1.0 mole excess) and sodium dispersion (18.4 g. in xylene containing 9.2 g. sodium, 0.4 mole). The run was carried out in the manner set forth above wherein the preparation of butane-1,4-diboronic acid is described and the ester was obtained and hydrolyzed in the same manner as described above. The ultimate product obtained was the decane-1,10-diboronic acid. A portion of the acid obtained was heated and the anhydride $[OB(CH_2)_{10}BO]_x$ obtained as a product.

*Examples IV through XLII.*—In addition to butaneboronic acid, other aliphatic boronic acids, borinic acids and borines can be prepared in a similar manner, as is shown in the attached tables. In each case, the aliphatic boron compound has the aliphatic moiety bonded directly to the boron atom.

*Examples XLIII through LVIII.*—In addition to the various aliphatic monoboronic acids, polyboronic acids, borinic acids and borines described in Examples I–XLII, the anhydrides of the aliphatic boronic, polyboronic and borinic acids can be obtained as the products in this process.

The anhydrides of aliphatic boronic and borinic acids have been prepared by dehydrating the acid (Snyder, J. Am. Chem. Soc., 60, 105 (1938)), as shown in Equations 12 and 13.

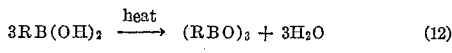

$$3RB(OH)_2 \xrightarrow{heat} (RBO)_3 + 3H_2O \qquad (12)$$

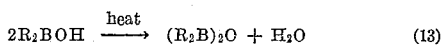

$$2R_2BOH \xrightarrow{heat} (R_2B)_2O + H_2O \qquad (13)$$

We have found that instead of isolating the acid (Example I, et seq.), the anhydride can be obtained if the product is heated. Table II gives some examples of anhydrides of aliphatic boronic, polyboronic and borinic acids which can be obtained in this way. The anhydrides of the aliphatic polyboronic acids, derived as they are from new compositions of matter, are themselves new compositions of matter and certain representative compounds are set forth in Examples LVI, LVII and LVIII below.

*Examples LIX through LXXIII.*—In addition to the various aliphatic boronic, polyboronic, borinic acids and borines described in Examples I–LVIII, the esters of aliphatic boronic, polyboronic and borinic acids can be obtained as products in this process.

Esters of aliphatic boronic and borinic acids have been prepared from the acid and alcohol (Letsinger and Skoog, J. Am. Chem. Soc., 76, 4174 (1954)), as illustrated in Equations 14 and 15.

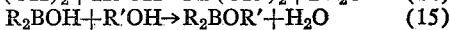

$$RB(OH)_2 + 2R'OH \rightarrow RB(OR')_2 + 2H_2O \qquad (14)$$
$$R_2BOH + R'OH \rightarrow R_2BOR' + H_2O \qquad (15)$$

As described in Example I above, the reaction mixture containing the boronate may be hydrolyzed. The free acid thus obtained can be esterified with any suitable alcohol. However, instead of hydrolyzing the ester, it can be directly removed from the reaction mixture by extraction with ether and purified by distillation.

Examples of some esters of aliphatic boronic, polyboronic and borinic acid which can thus be obtained from the process are given in Table III. The esters derived from the aliphatic polyboronic acids are also new compositions of matter and representative species of these are described in Examples LXIX, LXX and LXXI below.

The new process described provides the following improvements and advantages:

(1) Eliminates the use of the Grignard reagent which is expensive and hazardous.

(2) Permits working at higher temperatures than the usual —80° C., thus saving cost of refrigeration.

(3) Greatly reduces the expense in preparing aliphatic organo-boron compounds by using cheaper reagents and a simpler process.

(4) Permits the preparation of compounds containing a high boron to carbon ratio by a simple procedure.

(5) Provides a simple method for making aliphatic monoboronic acids, aliphatic polyboronic acids, aliphatic borinic acids, and aliphatic borines.

As aforementioned, various uses are known for the aliphatic boronic acids, the aliphatic borinic acids and the aliphatic borines. The aliphatic polyboronic acids, their esters and anhydrides, have been found to be excellent antioxidants. These materials are even better antioxidants than the aromatic polyboronic acids, since they are themselves more easily oxidized. They are soluble in hydrocarbons and thus may be used as antioxidants in petroleum oils or in other organic materials where an antioxidant is desired. For example, they may be used as antioxidants for aniline, a material used in dye making, wherein they inhibit the formation of color bodies which result from oxidation. The esters may also be used as antioxidants for oil and, in certain instances, they are preferred to the acids for this purpose since the esters are somewhat more oil-soluble than are the acids. This is especially true where one is dealing with straight chain hydrocarbons. To demonstrate the effectiveness of the polyboronic acids, tests were run wherein the butane-1,4-diboronic acid of Example III was tested as an antioxidant in aniline and catechol. The tests indicate, inter alia, that the polyboronic acids may be used for preventing discoloration of aromatic amines and phenols since discoloration is observed when oxidation of these materials occurs.

The results of the tests are set forth below:

Aniline, redistilled colorless, 100 ml., was placed in a graduated cylinder and 0.1 g. butane-1,4-diboronic acid added. A similar sample of aniline without addition of the boronic acid was prepared. Air was drawn through both samples simultaneously at an arbitrary uniform rate (aspirator) while heating both samples with a steam bath. Samples were withdrawn at 3, 5, 7 and 14 hours and results plotted with time as the ordinate and colorimeter readings as abscissa (FIG. 1).

Catechol, 10.0 g., and 0.1 g. butane-1,4-diboronic acid were dissolved in 100 ml. distilled water in a graduated cylinder. A similar sample of catechol solution without the boronic acid was also prepared. Air was drawn through both samples simultaneously at an arbitrary uniform rate and at ambient temperatures. Samples were withdrawn at 3, 5, 8 and 11 hours and the results plotted as above (FIG. 2).

The comparison of aniline with aniline containing butane-1,4-diboronic acid shown in FIG. 1 and of catechol and catechol solutions of butane-1,4-diboronic acid shown in FIG. 2 clearly indicate that butane-1,4-diboronic acid is an effective antioxidant.

The colorimeter readings plotted as abscissa are an index of color formation and hence oxidation.

Thus, the greater the slope of the curve, $$\frac{\Delta \text{ Time}}{\Delta \text{ Reading}}$$

the less the oxidation.

The stabilizing influence is exceptionally notable in the case of catechol where there is a very rapid initial oxidative change without the presence of boronic acid. This was visually observable in that the catechol solution was dark purple after three hours but the catechol solution containing butane-1,4-diboronic acid was only faintly purple.

Obviously, modifications and variations may be made without departing from the spirit and scope of this invention and therefore only such limitations should be imposed as are indicated in the appended claims.

This application is a continuation-in-part of application Serial No. 596,157 filed July 6, 1956 for "Process and Composition of Matter."

*Table I*

| Exp. No. | Starting halide | Mol. weight | Moles of alkyl sodium compound | Moles of borate ester | Product mol. weight | Percent B | Product |
|---|---|---|---|---|---|---|---|
| IV | $CH_3Cl$ | 50.49 | 0.25 | 0.25 | 59.87 | 18.07 | $CH_3B(OH)_2$ |
| V | $C_2H_5Cl$ | 64.52 | 0.25 | 0.25 | 73.90 | 14.64 | $C_2H_5B(OH)_2$ |
| VI | $n-C_3H_7-Cl$ | 78.54 | 0.25 | 0.25 | 87.92 | 12.31 | $C_3H_7B(OH)_2$ |
| VII | $n-C_4H_9Cl$ | 92.57 | 0.25 | 0.25 | 101.95 | 10.61 | $C_4H_9B(OH)_2$ |
| VIII | $i-C_4H_9Cl$ | 92.57 | 0.25 | 0.25 | 101.95 | 10.61 | $i-C_4H_9B(OH)_2$ |
| IX | $n-C_5H_{11}Cl$ | 106.60 | 0.25 | 0.25 | 115.98 | 9.33 | $n-C_5H_{11}B(OH)_2$ |
| X | $i-C_5H_{11}Cl$ | 106.60 | 0.25 | 0.25 | 115.98 | 9.33 | $i-C_5H_{11}B(OH)_2$ |
| XI | $n-C_6H_{13}Cl$ | 120.62 | 0.25 | 0.25 | 130.00 | 8.32 | $n-C_6H_{13}B(OH)_2$ |
| XII | $n-C_7H_{15}Cl$ | 134.65 | 0.25 | 0.25 | 144.00 | 7.51 | $n-C_7H_{15}B(OH)_2$ |
| XIII | $n-C_8H_{17}Cl$ | 148.67 | 0.25 | 0.25 | 158.05 | 6.85 | $n-C_8H_{17}B(OH)_2$ |
| XIV | $CH_3CH_2CH_2CH_2CHCH_2Cl$<br>$\quad\quad\quad\quad\quad\quad\quad\mid$<br>$\quad\quad\quad\quad\quad\quad C_2H_5$ | 148.68 | 0.25 | 0.25 | 158.05 | 7.28 | $CH_3CH_2CH_2CH_2CH-CH_2B(OH)_2$<br>$\quad\quad\quad\quad\quad\quad\quad\mid$<br>$\quad\quad\quad\quad\quad\quad C_2H_5$ |
| XV | $\quad\quad\quad\quad\quad CH_3$<br>$\quad\quad\quad\quad\quad\mid$<br>$CH_3-CH_2CH_2-C-CH_2Cl$<br>$\quad\quad\quad\quad\quad\mid$<br>$\quad\quad\quad\quad\quad CH_3$ | 135.66 | 0.25 | 0.25 | 145.04 | 7.46 | $\quad\quad\quad\quad\quad CH_3$<br>$\quad\quad\quad\quad\quad\mid$<br>$CH_3CH_2CH_2-C-CH_2B(OH)_2$<br>$\quad\quad\quad\quad\quad\mid$<br>$\quad\quad\quad\quad\quad CH_3$ |
| XVI | $CH_2Cl_2$ | 82.92 | 0.25 | 0.50 | 103.70 | 20.87 | $(HO)_2BCH_2B(OH)_2$ |
| XVII | $Cl-CH_2CH_2-Cl$ | 98.96 | 0.25 | 0.50 | 117.72 | 18.38 | $(HO)_2BCH_2CH_2B(OH)_2$ |
| XVIII | $\quad\quad\quad CH_2Cl$<br>$\quad\quad\quad\mid$<br>$ClCH_2-C-CH_2Cl$<br>$\quad\quad\quad\mid$<br>$\quad\quad\quad CH_2Cl$ | 209.94 | 0.25 | 1.00 | 243.46 | 17.78 | $\quad\quad\quad B(OH)_2$<br>$\quad\quad\quad\mid$<br>$\quad\quad\quad CH_2$<br>$\quad\quad\quad\mid$<br>$(HO)_2BCH_2-C-CH_2B(OH)_2$<br>$\quad\quad\quad\mid$<br>$\quad\quad\quad CH_2$<br>$\quad\quad\quad\mid$<br>$\quad\quad\quad B(OH)_2$ |
| XIX | $Br(CH_2)_2CH(CH_2Br)(CH_2)_2Br$ | 322.91 | 0.25 | 0.75 | 217.68 | 14.91 | $[(HO)_2B(CH_2)_2]_2CH[CH_2B(OH)_2]$ |
| XX | $CH_2=CH(CH_2)_3Cl$ | 104.58 | 0.25 | 0.25 | 113.98 | 9.49 | $CH_2=CH(CH_2)_3B(OH)_2$ |
| XXI | $CH_2=CH(CH_2)_4Cl$ | 118.61 | 0.25 | 0.25 | 127.98 | 8.45 | $CH_2=CH(CH_2)_4B(OH)_2$ |
| XXII | $CH_3OCH_2CH_2CH_2Cl$ | 108.57 | 0.25 | 0.25 | 117.95 | 9.17 | $CH_3OCH_2CH_2CH_2B(OH)_2$ |
| XXIII | $CH_3OCH_2-(CH_2)_4Cl$ | 136.62 | 0.25 | 0.25 | 146.00 | 7.41 | $CH_3OCH_2-(CH_2)_4B(OH)_2$ |
| XXIV | $PhOCH_2-(CH_2)_3Cl$ | 182.67 | 0.25 | 0.25 | 192.04 | 5.63 | $PhOCH_2-(CH_2)_3B(OH)_2$ |
| XXV | $Ph-CH_2O(CH_2)_3Cl$ | 182.67 | 0.25 | 0.25 | 192.04 | 5.63 | $PhCH_2O(CH_2)_3B(OH)_2$ |
| XXVI | $PhCH_2O-(CH_2)_4Cl$ | 198.69 | 0.25 | 0.25 | 208.07 | 5.20 | $PhCH_2O(CH_2)_4B(OH)_2$ |
| XXVII | $ClC_4H_8Cl$ | 128.07 | 0.25 | 0.50 | 145.78 | 14.84 | $(HO)_2B(CH_2)_4B(OH)_2$ |
| XXVIII | $ClC_4H_8Cl$ | 128.07 | 0.25 | 0.25 | 137.41 | 7.87 | $ClC_4H_8B(OH)_2$ |
| XXIX | $n-C_4H_9Cl$ | 92.57 | 0.50 | 0.25 | 142.05 | 7.62 | $(C_4H_9)_2BOH$ |
| XXX | $CH_3CH_2CH_2CH_2CHCH_2Cl$<br>$\quad\quad\quad\quad\quad\quad\quad\mid$<br>$\quad\quad\quad\quad\quad\quad C_2H_5$ | 148.68 | 0.50 | 0.25 | 254.27 | 4.26 | $(CH_3CH_2CH_2CH_2CHCH_2)_2BOH$<br>$\quad\quad\quad\quad\quad\quad\quad\quad\mid$<br>$\quad\quad\quad\quad\quad\quad\quad C_2H_5$ |
| XXXI | $CH_2=CH(CH_2)_2Cl$ | 90.56 | 0.50 | 0.25 | 138.03 | 7.84 | $[CH_2=CH(CH_2)_2]_2BOH$ |
| XXXII | $CH_3OCH_2(CH_2)_4Cl$ | 136.62 | 0.50 | 0.25 | 230.15 | 4.70 | $[CH_3OCH_2(CH_2)_4]_2BOH$ |
| XXXIII | $CH_3Cl$ | 50.49 | 0.75 | 0.25 | 55.82 | 19.38 | $(CH_3)_3B$ |
| XXXIV | $n-C_4H_9Cl$ | 92.57 | 0.75 | 0.25 | 182.16 | 5.94 | $(C_4H_9)_3B$ |
| XXXV | $n-C_6H_{13}Cl$ | 120.62 | 0.75 | 0.25 | 276.31 | 3.92 | $(C_6H_{13})_3B$ |
| XXXVI | $CH_2=CH(CH_2)_2Cl$ | 90.56 | 0.75 | 0.25 | 176.13 | 6.14 | $[CH_2=CH(CH_2)_2]_3B$ |
| XXXVII | $CH_3OCH_2(CH_2)_4Cl$ | 136.62 | 0.75 | 0.25 | 314.31 | 3.44 | $[CH_3OCH_2(CH_2)_4]_3B$ |
| XXXVIII | $ClC_4H_8Cl$ | 128.07 | 0.75 | 0.25 | 288.66 | 3.75 | $(ClC_4H_8)_3B$ |
| XXXIX | $(CH_3)_2NCH_2CH_2Cl$ | 107.60 | 0.25 | 0.25 | 116.86 | 9.26 | $(CH_3)_2NCH_2CH_2B(OH)_2$ |
| XL | $H_2NCH_2(CH_2)_3Cl$ | 107.60 | 0.25 | 0.25 | 116.86 | 9.26 | $H_2NCH_2(CH_2)_3B(OH)_2$ |
| XLI | $(CH_3)_2NCH_2CH_2Cl$ | 107.60 | 0.75 | 0.25 | 227.20 | 4.76 | $[(CH_3)_2NCH_2CH_2]_3B$ |
| XLII | $H_2NCH_2(CH_2)_3Cl$ | 107.60 | 0.75 | 0.25 | 227.20 | 4.76 | $[H_2NCH_2(CH_2)_3]_3B$ |

Table II

| Exp. No. | Acid | Moles acid | Moles H₂O removed | Product mol. weight | Percent B | Anhydride |
|---|---|---|---|---|---|---|
| XLIII | $CH_3B(OH)_2$ | 0.5 | 0.5 | 125.56 | 25.9 | $(CH_3BO)_3$ |
| XLIV | $C_3H_7B(OH)_2$ | 0.5 | 0.5 | 209.72 | 15.48 | $(C_3H_7BO)_3$ |
| XLV | $C_4H_9B(OH)_2$ | 0.5 | 0.5 | 251.80 | 12.89 | $(C_4H_9BO)_3$ |
| XLVI | $i-C_4H_9B(OH)_2$ | 0.5 | 0.5 | 251.80 | 12.89 | $(i-C_4H_9BO)_3$ |
| XLVII | $C_7H_{15}B(OH)_2$ | 0.5 | 0.5 | 378.03 | 8.59 | $(C_7H_{15}BO)_3$ |
| XLVIII | $CH_3CH_2CH_2\underset{\underset{CH_3}{\|}}{\overset{\overset{CH_3}{\|}}{C}}CH_2B(OH)_2$ | 0.5 | 0.5 | 378.03 | 8.59 | $(CH_3CH_2CH_2\underset{\underset{CH_3}{\|}}{\overset{\overset{CH_3}{\|}}{C}}CH_2BO)_3$ |
| XLIX | $CH_2=CH(CH_2)_3B(OH)_2$ | 0.5 | 0.5 | 287.83 | 11.28 | $[CH_2=CH(CH_2)_3BO]_3$ |
| L | $CH_3OCH_2(CH_2)_4B(OH)_2$ | 0.5 | 0.5 | 373.95 | 8.68 | $[CH_3OCH_2(CH_2)_4BO]_3$ |
| LI | $C_6H_5CH_2O(CH_2)_4B(OH)_2$ | 0.5 | 0.5 | 570.15 | 5.60 | $[C_6H_5CH_2O(CH_2)_4BO]_3$ |
| LII | $ClC_4H_8B(OH)_2$ | 0.5 | 0.5 | 355.14 | 9.14 | $(ClC_4H_8BO)_3$ |
| LIII | $(C_4H_9)_2BOH$ | 0.5 | 0.25 | 266.09 | 8.13 | $(C_4H_9)_4B_2O$ |
| LIV | $[CH_2=CH(CH_2)_2]_2BOH$ | 0.5 | 0.25 | 258.02 | 8.39 | $[CH_2=CH(CH_2)_2]_4B_2O$ |
| LV | $(CH_3)_2NCH_2CH_2B(OH)_2$ | 0.5 | 0.5 | 296.84 | 10.94 | $[(CH_3)_2NCH_2CH_2BO]_3$ |
| LVI | $(HO)_2BCH_2B(OH)_2$ | 0.25 | 0.5 | 67.67 | 31.98 | $(OBCH_2BO)_x$ |
| LVII | $(HO)_2BCH_2CH_2B(OH)_2$ | 0.25 | 0.5 | 81.69 | 26.49 | $(OBCH_2CH_2BO)_x$ |
| LVIII | $(HO)_2BCH_2\underset{\underset{CH_2-B(OH)_2}{\|}}{\overset{\overset{B(OH)_2}{\|}}{\underset{\|}{C}}}CH_2B(OH)_2$ (structure with two CH₂ branches) | 0.25 | 1.0 | 175.39 | 24.68 | $\left[OBCH_2\underset{\underset{CH_2}{\|}}{\overset{\overset{CH_2}{\|}}{C}}CH_2BO\right]_x$ with B=O groups |

Table III

| Exp. No. | Acid | Moles acid | Moles alcohol | Product mol. weight | Percent B | Ester |
|---|---|---|---|---|---|---|
| LIX | $CH_3B(OH)_2$ | 0.25 | 0.5 | 87.92 | 12.31 | $CH_3B(OCH_3)_2$ |
| LX | $C_3H_7B(OH)_2$ | 0.25 | 0.5 | 115.97 | 9.33 | $C_3H_7B(OCH_3)_2$ |
| LXI | $C_4H_9B(OH)_2$ | 0.25 | 0.5 | 130.00 | 8.32 | $C_4H_9B(OCH_3)_2$ |
| LXII | $i-C_4H_9B(OH)_2$ | 0.25 | 0.5 | 130.00 | 8.32 | $i-C_4H_9B(OCH_3)_2$ |
| LXIII | $C_7H_{15}B(OH)_2$ | 0.25 | 0.5 | 172.08 | 6.29 | $C_7H_{15}B(OCH_3)_2$ |
| LXIV | $CH_3CH_2CH_2\underset{\underset{CH_3}{\|}}{\overset{\overset{CH_3}{\|}}{C}}CH_2B(OH)_2$ | 0.25 | 0.5 | 172.08 | 6.29 | $CH_3CH_2CH_2\underset{\underset{CH_3}{\|}}{\overset{\overset{CH_3}{\|}}{C}}CH_2B(OCH_3)_2$ |
| LXV | $CH_2=CH(CH_2)_3B(OH)_2$ | 0.25 | 0.5 | 142.01 | 7.62 | $CH_2=CH(CH_2)_3B(OCH_3)_2$ |
| LXVI | $CH_3OCH_2(CH_2)_4B(OH)_2$ | 0.25 | 0.5 | 174.05 | 6.22 | $CH_3OCH_2(CH_2)_4B(OCH_3)_2$ |
| LXVII | $C_6H_5CH_2O(CH_2)_4B(OH)_2$ | 0.25 | 0.5 | 236.12 | 4.58 | $C_6H_5CH_2O(CH_2)_4B(OCH_3)_2$ |
| LXVIII | $ClC_4H_8B(OH)_2$ | 0.25 | 0.5 | 164.45 | 6.58 | $ClC_4H_8B(OCH_3)_2$ |
| LXIX | $(HO)_2BC_4H_8B(OH)_2$ | 0.25 | 1.0 | 201.88 | 10.72 | $(CH_3O)_2BC_4H_8B(OCH_3)_2$ |
| LXX | $(HO)_2BCH_2B(OH)_2$ | 0.25 | 1.0 | 159.80 | 13.54 | $(CH_3O)_2BCH_2B(OCH_3)_2$ |
| LXXI | $(HO)_2BCH_2\underset{\underset{CH_2-B(OH)_2}{\|}}{\overset{\overset{B(OH)_2}{\|}}{C}}CH_2B(OH)_2$ | 0.25 | 2.0 | 359.67 | 12.03 | $(CH_3O)_2BCH_2\underset{\underset{CH_2-B(OCH_3)_2}{\|}}{\overset{\overset{B(OCH_3)_2}{\|}}{C}}CH_2B(OCH_3)_2$ |
| LXXII | $(C_4H_9)_2BOH$ | 0.25 | 0.25 | 156.08 | 6.93 | $(C_4H_9)_2BOCH_3$ |
| LXXIII | $[CH_2=CH(CH_2)_2]_2BOH$ | 0.25 | 0.25 | 152.05 | 7.12 | $[CH_2=CH(CH_2)_2]_2BOCH_3$ |

We claim:

1. A process for preparing an aliphatic polyboronic acid comprising reacting a compound of the formula $R''(Na)_n$, where $n$ is an integer of 2 to 4 and $R''$ is selected from the class consisting of methylene, a polymethylene radical having 2 to 10 carbon atoms and pentaerythrityl, with a compound of the general formula $(R'O)_3B$, where $R'$ is selected from the class consisting of phenyl and lower alkyl, at least about one mole of said borate ester being provided for each mole of sodium, whereby to yield a polyboronic acid ester, and hydrolyzing the said ester to the said acid.

2. The process of claim 1 wherein $n$ is 2, $R''$ is tetramethylene and $R'$ is methyl.

3. The process of claim 1 wherein $n$ is 2, $R''$ is methylene and $R'$ is methyl.

4. The process of claim 1 wherein $n$ is 2, $R''$ is dimethylene and $R'$ is methyl.

5. The process of claim 1 wherein $n$ is 4, $R''$ is pentaerythrityl and $R'$ is methyl.

6. A process for the preparation of an aliphatic polyboronic acid ester comprising reacting a compound of the general formula $R''(Na)_n$, where $n$ is an integer of from 2 to 4 and $R''$ is selected from the class consisting of methylene, a polymethylene radical having 2 to 10 carbon atoms and pentaerythrityl, with a compound of the formula $(R'O)_3B$, where $R'$ is selected from the class consisting of phenyl and lower alkyl, at least about one mole of said borate ester being provided for each mole of sodium.

7. The process of claim 6 wherein $n$ is 2, $R''$ is tetramethylene and $R'$ is methyl.

8. The process of claim 6 wherein $n$ is 2, R" is methylene and R' is methyl.

9. The process of claim 6 wherein $n$ is 2, R" is dimethylene and R' is methyl.

10. The process of claim 6 wherein $n$ is 4, R" is pentaerythrityl and R' is methyl.

11. A process for the production of an aliphatic polyboronic acid anhydride comprising reacting a compound of the formula R"(Na)$_n$, where $n$ is an integer of from 2 to 4 and R" is selected from the class consisting of methylene, a polymethylene radical having 2 to 10 carbon atoms and pentaerythrityl, with a compound of the general formula (R'O)$_3$B, where R' is selected from the class consisting of phenyl and lower alkyl, at least about one mole of said borate ester being provided for each mole of sodium, whereby to yield a polyboronic acid ester, hydrolyzing said polyboronic ester to a polyboronic acid and thereafter dehydrating the said acid to said anhydride.

12. A process for the preparation of an aliphatic polyboronic acid comprising reacting a compound of the formula R"X$_n$, where $n$ is an integer of from 2 to 4, R" is selected from the class consisting of methylene, a polymethylene group having 2 to 10 carbon atoms and pentaerythrityl and X is a halogen with finely dispersed metallic sodium whereby to form a compound of the formula R"(Na)$_n$, thereafter reacting the product so formed with a borate ester of the general formula (R'O)$_3$B, where R' is selected from the class consisting of phenyl and lower alkyl, at least about one mole of said borate ester being provided for each two moles of sodium whereby to form a polyboronic acid ester and hydrolyzing the said ester to the said polyboronic acid.

13. The process of claim 12 wherein R" is tetramethylene, X is Cl, R' is methyl and $n$ is 2.

14. The process of claim 12 wherein R" is methylene, X is Cl, R' is methyl and $n$ is 2.

15. The process of claim 12 wherein R" is dimethylene, X is Cl, R' is methyl and $n$ is 2.

16. The process of claim 12 wherein R" is pentaerythrityl, X is Cl, R' is methyl and $n$ is 4.

17. As a new composition of matter, R"[B(OH)$_2$]$_n$ where R" is selected from the class consisting of methylene, polymethylene having 2 to 10 carbon atoms and pentaerythrityl and wherein $n$ is an even integer between two and four.

18. As a new composition of matter $$(HO)_2BCH_2CH_2CH_2CH_2B(OH)_2$$

19. As a new composition of matter $$(OH)_2BCH_2B(OH)_2$$

20. As a new composition of matter $$(HO)_2BCH_2CH_2B(OH)_2$$

21. As a new composition of matter [(HO)$_2$BCH$_2$]$_4$C.

22. As a new composition of matter [(R'O)$_2$BCH$_2$]$_4$C, where R' is selected from the group consisting of lower alkyl, hydrogen and phenyl.

23. As a new composition of matter (OBCH$_2$BO)$_x$ wherein $x$ is an integer indicative of the degree of polymerization.

24. As a new composition of matter (OBCH$_2$CH$_2$BO)$_x$ wherein $x$ is an integer indicative of the degree of polymerization.

25. As a new composition of matter [C(CH$_2$BO)$_4$]$_x$ wherein $x$ is an integer indicative of the degree of polymerization.

26. A compound selected from the group consisting of compounds of the general formulae (RO)$_2$BR"B(OR)$_2$, [(R'O)$_2$BCH$_2$]$_4$C and [R"(BO)$_n$]$_x$ wherein R" is selected from the class consisting of methylene, polymethylene having two to ten carbon atoms and pentaerythrityl, R is selected from the class consisting of hydrogen and phenyl, R' is selected from the group consisting of lower alkyl, hydrogen and phenyl, $n$ is an even integer between two and four and $x$ is an integer indicative of the degree of polymerization.

References Cited in the file of this patent
UNITED STATES PATENTS 2,402,590     Arnold _____ June 25, 1946

OTHER REFERENCES

Lappert et al.: Chem. Reviews, vol. 56, p. 1054 (1956).
Urry et al.: J. Am. Chem. Soc., vol. 76, pp. 5299 to 5301 (1954).

UNITED STATES PATENT OFFICE
CERTIFICATION OF CORRECTION

Patent No. 3,030,406                                                  April 17, 1962

Robert M. Washburn et al.

It is hereby certified that error appears in the above numbered patent requiring correction and that the said Letters Patent should read as corrected below.

In the grant, lines 1 to 3, for "Robert M. Washburn and Franklin A. Billig, of Whittier, California," read -- Robert M. Washburn and Franklin A. Billig, of Whittier, California, assignors to American Potash & Chemical Corporation, a corporation of Delaware, --; line 12, for "Robert M. Washburn and Franklin A. Billig, their heirs" read -- American Potash & Chemical Corporation, its successors --; in the heading to the printed specification, lines 3 and 4, for "Robert M. Washburn and Franklin A. Billig, Whittier, Calif." read -- Robert M. Washburn and Franklin A. Billig, Whittier, Calif., assignors to American Potash & Chemical Corporation, a corporation of Delaware --.

Signed and sealed this 16th day of October 1962.

(SEAL)
Attest:

ERNEST W. SWIDER                                    DAVID L. LADD

Attesting Officer                                       Commissioner of Patents